Dec. 21, 1965  W. A. COPPOCK ETAL  3,224,324
METHOD OF PRESENTATION OF COMPRESSIONABLE FIBROUS SAMPLES
Filed Sept. 27, 1962

INVENTOR.
WESLEY A. COPPOCK
SAM W. BURDGE
BY
ATTORNEY

3,224,324
METHOD OF PRESENTATION OF COMPRESSIONABLE FIBROUS SAMPLES
Wesley A. Coppock and Sam W. Burdge, Cary, N.C., assignors to Monsanto Company, a corporation of Delaware
Filed Sept. 27, 1962, Ser. No. 226,647
4 Claims. (Cl. 88—14)

This invention relates generally to a method of sample presentation for purposes of color analyses and to apparatus for its practice, and more particularly to a method of and apparatus for the presentation of compressionable samples in accurately reproducible fashion.

Though the following description may have particular reference to color measurements of samples of textile fibers, it is to be understood that this invention is not necessarily limited thereto and may readily be employed in the testing of fibrous samples in general.

When light is impinged on a fibrous sample surface, the amount of light reflected at any given wave length is dependent upon several factors, the more important being spectral distribution of the source light, geometry of the sample surface and sample color. Obviously, where it is desired to make accurate quantitative color measurements, sample color should ideally constitute the only uncontrolled variable and accurate control of the other factors effecting color measurements is most essential. Since a constant light source having spectral distribution closely approximating that of normal day light is incorporated in widely available modern day spectrophotometers, the major problem thus becomes that of accurately controlling the manner of presenting to such a light source samples having surface characteristics of high reproducibility.

A major problem that must be overcome if one is to accomplish accurate reproducibility of surface characteristics of samples presented for color analysis is the presence of voids in the sample surface, which voids tends to lower the overall amount of light reflected at all wave lengths. Obviously, the larger and more numerous the voids, the greater this effect will be. A more practical method of eliminating such voids in a given fiber sample is to compress it to such a degree that a substantially planar surface is closely approximated. The amount of compression required to accomplish this is mainly dependent on the fiber denier and the degree to which a sample has been carded, or otherwise given a desirable random orientation. For example, a well-carded, low denier staple will form an adequate surface at a much lower level of compression than an uncarded high denier sample. The optimum amount of compression is therefore dependent on the type sample to be analyzed.

Various prior art methods and apparatus have been proposed which are directed to the problem presented by uncontrolled variations in sample surface geometry, but in situations demanding highly accurate color determinations, such methods and apparatus have been found subject to what might otherwise be permissible variations and to be more time-consuming in execution and otherwise of less practicality. For example, it is known to hand load a sample holder as a simple mode of preparing samples for color determinations, but a high order of precision and reproducibility in sample surface geometry and fiber pack density are virtually impossible due to the human error inherent in such a method. Also, this method necessitates the accurate weighing of each sample prior to being loaded in the holder, a requirement which has been obviated by the present invention. It has also been proposed to employ a spring-loaded holder, but, here again, one encounters the necessity of accurately weighing each sample prior to loading in order to minimize the error that would otherwise be introduced by the fact that sample compression, and, therefore, sample surface geometry, will vary inversely with spring compression, and it obviously follows that varying weight samples of equal compressionability will be subjected to varying degrees of compression. A further objection to spring-loaded holders that cannot be conveniently compensated is the fact that equal weight samples of varying compressionability will be subjected to varying degrees of compression with the same adverse effect upon sample surface geometry, which effect is impossible of accurate reproduction. Also, unless true fiber density and denier per filament are nearly the same for all samples tested, surface geometry will not be adequately duplicated. Another mode of dealing with this problem has been an attempt to compress bulk samples into discs, experimental evidence indicated that a pressure in the neighborhood of 80,000 pounds per square inch is required to compress most samples sufficiently. With lesser amounts of pressure applied, the disc would not retain its shape long enough to allow measurements of its color. Moreover, this method is rendered impractical where highly accurate determinations are necessary by virtue of the fact that yellowing occurs in many types of samples as a result of heat generated by such high levels of compression. Still another approach to this problem is that of dissolving the sample in a color neutral solvent and forming a sample cake, but this method is obviously of no avail where it is desired to perform further treatments after color analysis, wherein any sample consumption during the color analysis process is prohibited.

As the surface geometry of a fiber sample is changed as a result of compression, the amount of light reflected from the sample surface likewise changes. This is due to changes in the number of voids and irregularities in the sample surface. The degree of compression required to stabilize the amount of light reflected at all wavelengths from the sample surface is considered as the optimum level of compression. Compression above this point will produce no further changes in reflectance at any wavelength. On flat, opaque samples such as knit tubing, compression effects are small as compared to those experienced with less opaque, low density bulk fiber samples. In a color analysis lab where a variation of sample configuration is experienced routinely, it is most practical to compress all samples to a point exceeding the amount required for the most irregular surface normally encountered. Even though such a degree of compression may far exceed the optimum for certain samples, no error will be introduced since compression above the optimum point does not produce any change in the amount of light reflected at any wave length.

It is therefore an object of the present invention to provide an improved method and apparatus for the presentation of compressionable samples for color analysis. A further object of this invention is to provide an apparatus for use in making color analyses which is capable of accurately reproducing sample surface geometry. Still another object of this invention is to provide a sample presentation apparatus for use in making color analyses of compressionable samples, which apparatus eliminates the necessity of providing samples of uniform weight. Yet another object is to provide such a sample presentation apparatus which is fluid-actuated at or above an optimum minimum pressure. A further object is to provide a pneumatically-actuated sample presentation apparatus which is designed to accept varying weight samples. Another object is a sample presentation apparatus designed for rapid operation and capable of accurately reproducing sample surface geometry. Still another object of this invention is to provide a method of presenting compressionable samples for color analyses, which method obviates the necessity of providing samples of uniform weight.

A further object is to provide a non-destructive method of presentation of compressionable samples for color analyses. A further object is a method of sample presentation employing a pneumatically-actuated compression means to impose a predetermined optimum pressure of compression upon samples of varying physical characteristics.

According to the present invention, the foregoing and other objects are attained by providing a pneumatically-actuated sample presentation apparatus comprising a sample holder provided with a planar, transparent view port and a spring bias, pneumatically-actuated compression assembly designed to be rapidly engaged and disengaged from the sample holder, which apparatus may be operated to compress a given sample above a predetermined optimum pressure beyond which further compression will have no effect upon the surface geometry or, concomitantly, upon pack density of the sample.

In accordance with another aspect of this invention the foregoing and other objects are served by providing a method of presenting compressionable samples for color analyses, which method comprehends the steps of preparing the desired sample, compressing it, preferably by means of a pneumatically-actuated compressing agent, above a predetermined optimum pressure of compression beyond which no further variation in the surface characteristics of the sample are observed, and measuring the light reflectance of a sample so presented.

A better understanding of the invention may be had from the following detailed description of an illustrative embodiment thereof when read in conjunction with the appended drawings, in which.

Figure 1:
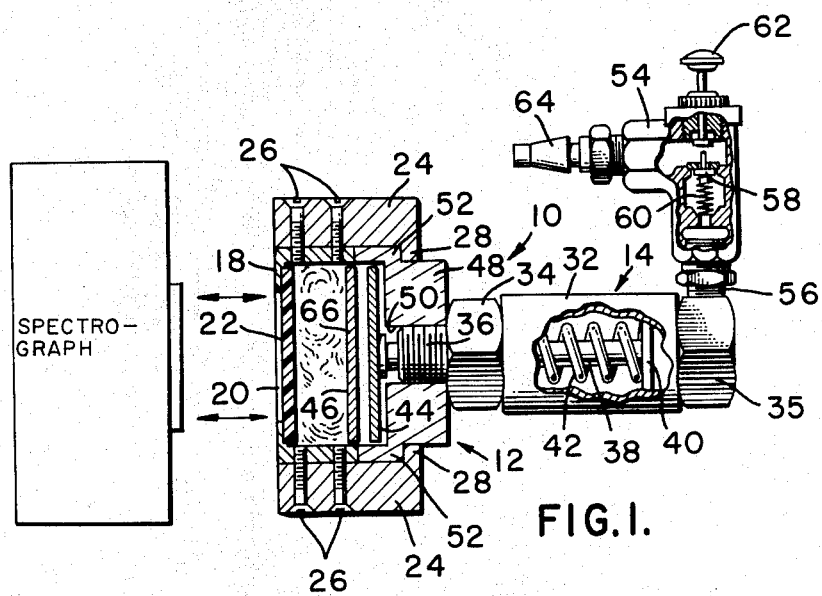
FIG. 1 is partially sectionalized, assembled view of the sample presentation apparatus showing the interrelationship between the sample holder and the sample compression mechanism.
Figure 2:
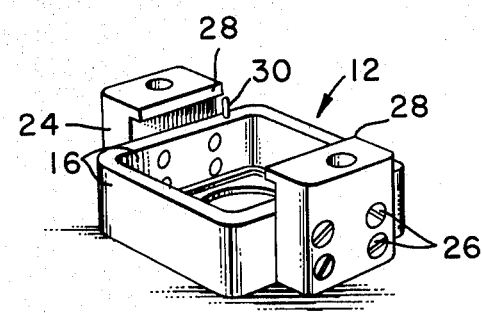
FIG. 2 is a pictorial view of the sample holder shown in FIG. 1.
Figure 3:
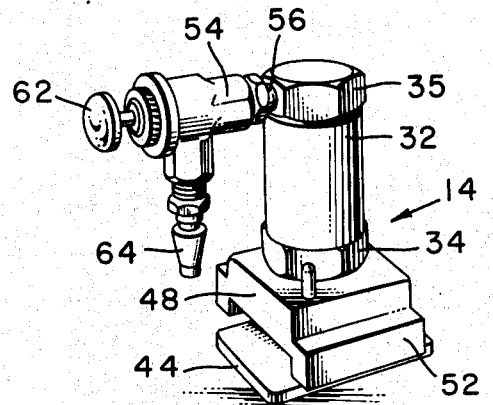
FIG. 3 is a pictorial view of the sample compression mechanism of FIG. 1.

Referring, now, in detail to the drawings and more particularly to FIG. 1, there is shown a fully assembled sample presentation apparatus, generally indicated by arrow 10, basically comprising a sample holder 12, as pictorially represented in FIG. 2, and a sample compression mechanism 14, shown pictorially in FIG. 3. Considering first the details of the sample holder 12, there is provided a sample receptacle 16 having upstanding wall portions and a base portion 18 which may be integral with the wall portions and a viewing port 20 formed in said base portion centrally thereof. A transparent plate 22 shaped to substantially conform to the interior of the sample receptacle, as defined by the wall portions and base portion, and of sufficient thickness to resist the pressure that will be encountered in operation, one-quarter of an inch having been found sufficient in practice. On laterally opposed sides of the sample receptor 16 there are provided mounting bosses 24 which are affixed to the wall portions of the sample receptacle by any suitable means such as machine screws 26. Each of the mounting bosses 24 are provided with integral, laterally opposed, inwardly extending flanges 28 for a purpose later to be described. Though numerous ways of engaging the sample holder 12 with a suitable spectrophotometeric instrument will readily suggest themselves, it has been found convenient to affix to such an instrument a mounting bracket, not illustrated, of such configuration as to receive the mounting bosses 24 of the sample holder in sliding engagement in order to facilitate rapid operation. As an added convenience, a suitably placed locator pin 30 may be mounted in the upper surface of the wall portion to automatically align the sample compression mechanism 14 upon its engagement with the sample holder 12.

Turning now to the details of the sample compression mechanism 14, it is seen to comprise a cylinder 32 provided with external threading at either end to receive cap nuts 34, 35. Cap nut 34 is provided with an integral extension in the form of an externally-threaded hollow standard 36 which slidably mounts piston rod 38. The end of piston rod 38 extending externally of cylinder 32 and hollow standard 36 is provided with a compression plate 44 having a substantially planar sample engaging surface 46 which extends substantially parallel to transparent plate 22 when the sample compression mechanism is engaged with the sample holder 12, as shown in FIG. 1. A cylinder adaptor plate 48 is provided with a central, internally-threaded aperture 50 of such dimension as to threadably engage standard 36. This adaptor plate is provided with a pair of laterally outwardly extending shoulder portions 52 shaped to engage the flanges 28 of the sample holder 12. Valve 54 is mounted at the end of cylinder 32 opposite from that of the compression plate 44 and communicates with the interior of the cylinder by way of pipe nipple 56, which threadably engages cap nut 34 and the wall of cylinder 32. This valve is of the two-way, self-sealing type having a manually-actuated relief. This may take the form of a valve element 58 spring-biased to its closed position by valve spring 60, which spring may be overcome by depressing relief knob 62 to thereby vent the interior of cylinder 32 to the atmosphere by way of adaptor 64, which adaptor may conveniently be in the form of a nipple suitable for rapid engagement with a source of known air pressure.

In operation, a suitable amount of sample is placed in the receptacle 16 of sample holder 12, the sample conveniently being held in place by a plate 66 preparatory to engaging the sample compression mechanism 14 with the sample holder. Before assembling the compression mechanism and the holder, relief knob 62 is depressed to allow spring 42 to urge the piston rod to its fully retracted position, wherein compression plate 44 will be snugged up against the cylinder adaptor plate 48. The compression mechanism is then engaged with the sample holder by sliding shoulder portions 52 under flanges 28 until the shoulder portions abut the locator pin 30 to thereby align the compression plate 44 with the sample receptacle 16. With the presentation apparatus so assembled, a known source of pressurized air is introduced through nipple 64, which air acts to depress valve spring 60 to thereby gain access to the interior of cylinder 32. Admission of pressurized air through the cylinder 32 will act to urge piston 40 against compression spring 42 to bring plate 44 into compressing engagement with sample. The source of pressurized air is then removed and the presentation apparatus is mounted on a spectrophotometeric instrument employing any suitable bracket means, whereupon a reading may immediately be taken. After recording the desired color measurements the apparatus is quickly disassembled in preparation for making other measurements simply by depressing the relief knob 62 to allow spring-return of compression plate 44 and sliding the compression mechanism 14 out of engagement with flange 28 of sample holder 12. Since the condition of the sample has not been affected by such a testing it is available for further treatments and, if desired, additional color measurements.

It will be appreciated that there has been herewith disclosed an improved method for the presentation of samples for color analyses and apparatus for its practice which, by overcoming uncontrolled variations in sample surface geometry, make it possible to run color measurements of heretofore unattainable accuracy and speed without the necessity of weighed samples. Within certain wide limitations, samples of greatly varying weight may be analyzed by the present method and apparatus with uniform high accuracy and it is only necessary that the sample be sufficiently large as to assure absolute opaqueness when compressed within the sample receptacle 16. The minimum size sample for a given size sample holder that will meet this requirement may be quickly determined by measuring the light reflectance samples of a weight insufficient to be opaque when compressed and gradually increasing the weight of such samples until their color measurements remain constant. Samples of this or any larger weight will give accurate results. It is significant to note that, regardless of the amount of sample employed, the degree of sample compression may be accurately controlled by virtue of the employment of pneumatic compression and by virtue of the fact the surface geometry of a given sample, and therefore its light reflectance, will remain constant above an optimum pressure, which optimum pressure is easily determined simply by measuring the total reflectance of the sample at increasing sample compressions until a constant level of reflectance is attained. In day to day operations, where samples of widely varying characteristics are commonly encountered, it will be found convenient to practice this invention at a regulated pressure slightly in excess of the highest optimum pressure it is anticipated will be encountered. For example, an air-gunned, 15 denier-per-filament polyester is one of the most difficult of all fiber samples with which to reproduce surface geometry characteristics and has a relatively high optimum pressure of 70 p.s.i.g., above which reflectance fluctuations due to fiber pack density or, by the same token, surface geometry characteristics, disappear. Assuming this to be the maximum pressure that will be encountered, it will be found convenient to make all color measurements at a compression of 80 p.s.i.g.

Obviously numerous modifications and variations of the present invention are possible in the light of the above teachings. It is therefore to be understood that within the scope of the appended claims the invention may be practiced otherwise than as specifically described herein.

What is claimed is:

1. A non-destructive method of presentation of void-containing fibrous samples for color analyses comprising the steps of inserting said sample between a planar, transparent viewing means and a piston, fluidly actuating said piston to compress said sample against said viewing means to a degree beyond which light reflectance from said sample through said viewing means remains substantially constant, measuring the light reflectance of said sample while so compressed.

2. A non-destructive method of presentation of void-containing fibrous samples for color analyses comprising the steps of inserting such samples between a planar, transparent viewing means and a piston means, pneumatically actuating said piston to compress such samples against said viewing means to a degree beyond which light reflectance from said samples through said viewing means remains substantially constant, measuring the light reflectance of said samples while so compressed.

3. A non-destructive method of presentation of void-containing fibrous samples for color analyses comprising the steps of compressing said samples between a viewing means and a pneumatically-actuated piston to a point beyond which further compression produces substantially no change in the light reflecting characteristics of said samples through said viewing means, measuring the light reflectance of the samples while so compressed.

4. A non-destructive method of presentation of void-containing fibrous samples for color analyses comprising the steps of inserting said sample between a planar, transparent viewing means and a piston, fluidly actuating said piston to compress said sample against said viewing means to a point beyond which the pack density of said sample, as viewed through said viewing means remains substantially constant.

References Cited by the Examiner

UNITED STATES PATENTS

| 795,729 | 7/1905 | Otzen | 100—229 |
|---|---|---|---|
| 2,332,674 | 10/1943 | Smith. | |
| 3,079,505 | 2/1963 | Weir et al. | 250—83 |

OTHER REFERENCES

Nickerson et al: "New Automatic Colorimeter for Cotton," JOSA, vol. 40, No. 7 (1950), pp. 446–449.

JEWELL H. PEDERSEN, *Primary Examiner.*